(No Model.)

W. M. McCARTHY.
BICYCLE BRAKE.

No. 535,391.　　　　　　　　　Patented Mar. 12, 1895.

Witnesses:
Harriet Johnson
Arthur J. Sangster.

Inventor.
William M. McCarthy
By James Sangster,
Attorney.

THE NORRIS PETERS CO., PHOTO-LITHO., WASHINGTON, D. C.

UNITED STATES PATENT OFFICE.

WILLIAM M. McCARTHY, OF BUFFALO, NEW YORK.

BICYCLE-BRAKE.

SPECIFICATION forming part of Letters Patent No. 535,391, dated March 12, 1895.

Application filed July 9, 1894. Serial No. 516,896. (No model.)

*To all whom it may concern:*

Be it known that I, WILLIAM M. McCARTHY, a citizen of the United States, residing in Buffalo, in the county of Erie and State of New York, have invented certain new and useful Improvements in Bicycle-Brakes, of which the following is a specification.

My invention relates to that class of bicycle brakes that are adapted to be operated by the foot, and it consists in certain improvements whereby a brake and foot rest are combined in one, all of which will be fully and clearly hereinafter described and claimed, reference being had to the accompanying drawings, in which—

Figure 1:
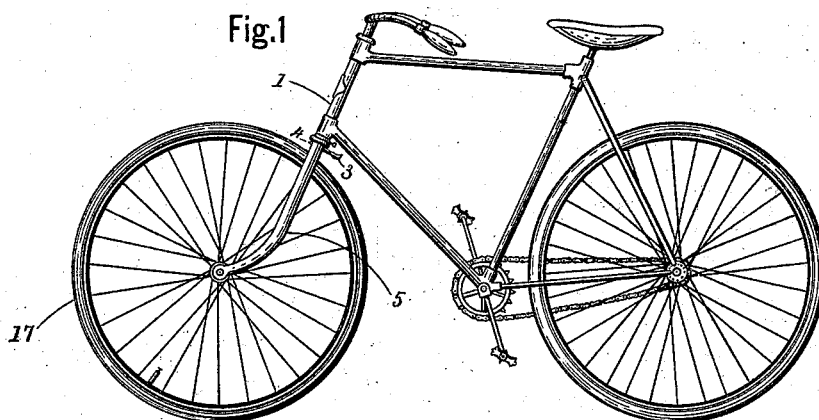
Figure 2:
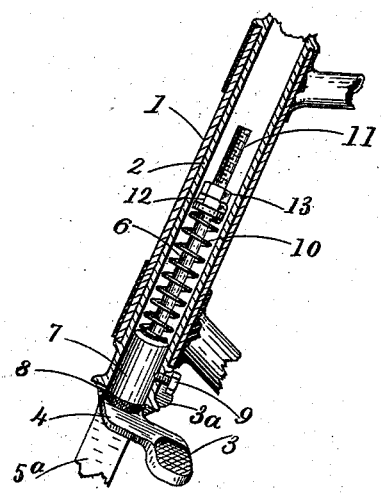
Figure 3:
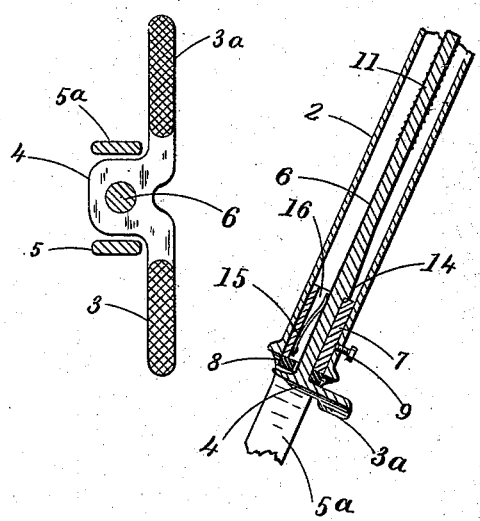
Figure 4:
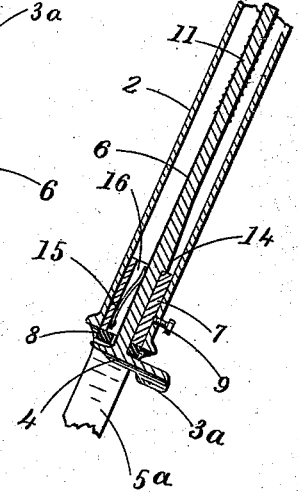

Figure 1, represents a side elevation of a bicycle showing my invention connected thereto. Fig. 2, is a detached central sectional elevation through a bicycle head sleeve and bicycle fork head, showing a perspective view of my improved device connected therewith. Fig. 3, is a plan or top view of my combined bicycle brake and rest, showing also a horizontal section through the sides of the bicycle fork and the brake supporting rod. Fig. 4, represents a vertical central section through the bicycle fork head, cutting also centrally through the brake, its supporting rod, and the supporting rod collar or sleeve and rubber washer, the spiral spring and its tightening nuts being omitted.

Referring to the drawings in detail, 1 represents the ordinary bicycle head sleeve; 2, the bicycle fork head. The usual bicycle fork head 2, being hollow my improved brake is easily attached thereto.

The brake consists of the two oppositely projecting arms 3 and 3ª. In the center of the brake is a laterally extending portion 4, which fits loosely in between the two sides 5 and 5ª of the bicycle fork. Centrally or substantially so is rigidly secured to the brake, a supporting bar 6, which extends upward on an incline. On this brake supporting bar 6, is fitted a sleeve or collar 7, and between the bottom of the collar 7, and the top of the brake is a rubber washer 8. The sleeve or collar 7, is held rigidly in place, in its position within the brake head by means of a set screw 9, so that when operating the brake, the brake supporting bar 6, slips easily up or down therein. The object of this construction will appear farther on.

The brake supporting bar is provided with a spiral spring 10, which is passed over the bar and rests on the top of the sleeve or collar 7. The upper portion of the brake supporting bar is a screw portion 11, on which is an adjusting nut 12, secured by a jam nut 13.

At the front side of the brake supporting bar, I have shown in Fig. 4, a projecting portion 14, which catches over the top of the collar 7, and a spring 15, at the back of the brake bar keeps it in engagement therewith until disengaged by the feet as will more clearly hereinafter appear. The hole 16, through which the brake bar passes is made large enough to allow the necessary movement for the above purpose.

The operation of the device will be readily understood from the drawings and foregoing description. When the parts are in the position shown in Fig. 4, the device answers as a foot rest. When it is desired to use the brake all that is necessary to do is to push forward so as to disengage the catch from the top of the collar 7, and then push downward with sufficient power to overcome the force of the spring 10, and bring the brake in contact with the bicycle wheel tire 17.

If desired the spring 10, may be made strong enough to hold the brake up with sufficient force to answer for a foot rest, and when it is desired to operate the brake all that is required to be done is to press downward by the feet with sufficient force to operate it. In this case the spring 15, and the catch 14, may be dispensed with.

The force of the spring 10, may be either increased or diminished by the nut 12, and then secured by the jam nut 13. This is easily done by removing the front bicycle wheel, then loosening the set screw 9, and then removing the brake therefrom until the necessary adjustment has been made.

I claim as my invention—

1. A combined bicycle brake and foot rest, consisting of two oppositely extending arms having a laterally extending portion adapted to pass between the sides of the bicycle fork, in combination with a brake supporting bar adapted to pass up into the bicycle fork head, a collar and means for securing it to the bicycle fork head, a spiral spring for holding the brake up to its normal position and means for adjusting the same, substantially as described.

2. In a combined bicycle brake and foot rest, the combination with the brake, its supporting bar and spiral spring of a collar upon which said spring rests and is supported, means for securing said collar rigidly in place, a catch on the supporting bar adapted to catch on the top of said collar and a spring for keeping the catch in engagement, substantially as described.

WILLIAM M. McCARTHY.

Witnesses:
JAMES SANGSTER,
ARTHUR J. SANGSTER.